United States Patent [19]

Takatori et al.

[11] Patent Number: 5,235,365
[45] Date of Patent: Aug. 10, 1993

[54] FILM INITIAL ADVANCE APPARATUS AND METHOD FOR PHOTOGRAPHIC CAMERA

[75] Inventors: Tetsuya Takatori; Hideaki Kataoka, both of Kanagawa, Japan

[73] Assignee: Fuji Photo Film Co., Ltd., Kanagawa, Japan

[21] Appl. No.: 757,355

[22] Filed: Sep. 10, 1991

[30] Foreign Application Priority Data

Sep. 10, 1990 [JP] Japan ................................. 2-240396
Jun. 12, 1991 [JP] Japan ................................. 3-167697

[51] Int. Cl.⁵ ............................................. G03B 1/18
[52] U.S. Cl. .............................................. 354/173.11
[58] Field of Search ................. 354/173.1, 173.11, 212, 354/213, 214, 288

[56] References Cited

U.S. PATENT DOCUMENTS

| | | | |
|---|---|---|---|
| 3,946,409 | 3/1976 | Toyoda | 354/173.11 |
| 4,832,275 | 5/1989 | Robertson | 354/275 X |
| 4,834,306 | 5/1989 | Robertson et al. | 354/275 X |
| 4,846,418 | 7/1989 | Fairman | 354/275 X |
| 4,855,773 | 8/1989 | Harvey | 354/173.1 |
| 4,860,041 | 8/1989 | Harvey | 354/212 |
| 4,887,776 | 12/1989 | Niedospial, Jr. et al. | 354/275 X |
| 4,996,549 | 2/1991 | Yamaguchi | 354/173.11 |
| 5,061,950 | 10/1991 | Suzuki et al. | 354/173.11 |

FOREIGN PATENT DOCUMENTS 2-67534 3/1990 Japan.
2-113230 4/1990 Japan.

Primary Examiner—Michael L. Gellner
Assistant Examiner—Howard B. Blankenship
Attorney, Agent, or Firm—Sughrue Mion Zinn Macpeak & Seas

[57] ABSTRACT

A photographic camera includes a cassette chamber for containing a film cassette having a fork provided therein which is coupled to a spool in order to rotate the spool. After loading the film cassette in the cassette chamber, the fork is rotated by a motor in the winding direction for tightening a roll of the photographic film in order to prevent a film from jamming when advancing the film leader. The fork is then rotated in a normal or forward direction for advancing the film leader. In a preferred embodiment, a photosensor detects the photographic film fed from the film cassette and generates a detection signal. The fork is rotated in the normal direction before the reverse rotation. It is then determined whether the photographic film is advanced. If not, the fork is rotated in the reverse direction.

4 Claims, 10 Drawing Sheets

FILM INITIAL ADVANCE APPARATUS AND METHOD FOR PHOTOGRAPHIC CAMERA

BACKGROUND OF THE INVENTION

The present invention relates to a photographic camera and a method for initially advancing photographic film in the camera, and more particularly to a film initial advance apparatus and method for a camera in which rotation of a spool of a film cassette causes a film leader to advance out of the film cassette.

There are known 35 mm self-advancing film cassettes which have a film leader that does not protrude from the cassette shell but rather is contained therein, as disclosed in U.S. Pat. Nos. 4,832,275, 4,834,306 and 4,846,418, for example. Rotation of a spool, in an unwinding direction of the photographic film by a film feeding mechanism causes the film leader to advance outside of the cassette shell through a film passageway of the film cassette. In order to prevent the roll of photographic film wound on the spool from loosening, there are provided flanges on the spool or ridges inside the cassette shell.

A camera suitable for using the self-advancing film cassette as described above is disclosed in U.S. Pat. No. 4,855,773, and Japanese Patent Laid-open Publications Nos. 2-113230 and 2-67534. The film feeding mechanism incorporated in such a camera rotates a fork for transporting the photographic film in a normal or unwinding direction and a reverse or rewinding U.S. Pat. No. 4,860,041, for example, the fork is rotated in the normal direction when the back lid is closed so as to advance the film until the first frame is positioned on an exposure aperture of the camera.

In such a film cassette, however, the film roll might be loosely wound around the spool, which will increase the pressure or friction between the outer surface of the film roll and the ridges or inner surface of the flanges. Such a high pressure or friction between the outer surface of the film roll and the ridges or inner surface of the flanges may cause the film to jam when trying to advance the film leader to the outside of the film cassette by rotating the spool. That is, the film leader might be stopped on an inner surface of the cassette shell due to the high contact pressure or friction to cause the film to jam. Using a larger force to rotate the fork may serve to prevent the film from jamming, but necessitates a stronger motor in the camera which increases the cost of the camera. In addition, the film feeding mechanism must be made from a stronger material, which will increase the cost of the camera.

SUMMARY OF THE INVENTION

It is therefore an object of the present invention to provide a photographic camera for use with a self-advancing film cassette in which rotation of the spool does not cause the film to jam when the film leader is advanced out of the film cassette.

The above and other objects and advantages of this invention are accomplished by a photographic camera which includes a cassette chamber for containing the film cassette, a rotary member provided in the cassette chamber for coupling with the spool in order to rotate the spool, a motor for rotating the rotary member, and drive control means for rotating and for rotating the motor in an unwinding direction in order to advance the film leader thereby preventing the film from jamming when being advanced out of the film cassette. Because only a rather small force is needed to rotate the fork, no additional cost is incurred.

In accordance with a preferred embodiment of the present invention, the camera includes detecting means for detecting a photographic film being fed from the film cassette and for generating and applying a detection signal to the drive control means, which rotates the motor in the normal direction before rotating the motor in the reverse direction. The drive control means rotates the motor in the reverse direction in order to tighten the film roll if no detection signal is generated from the detecting means, even after a lapse of a predetermined time after the start of the motor rotating in the normal direction.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
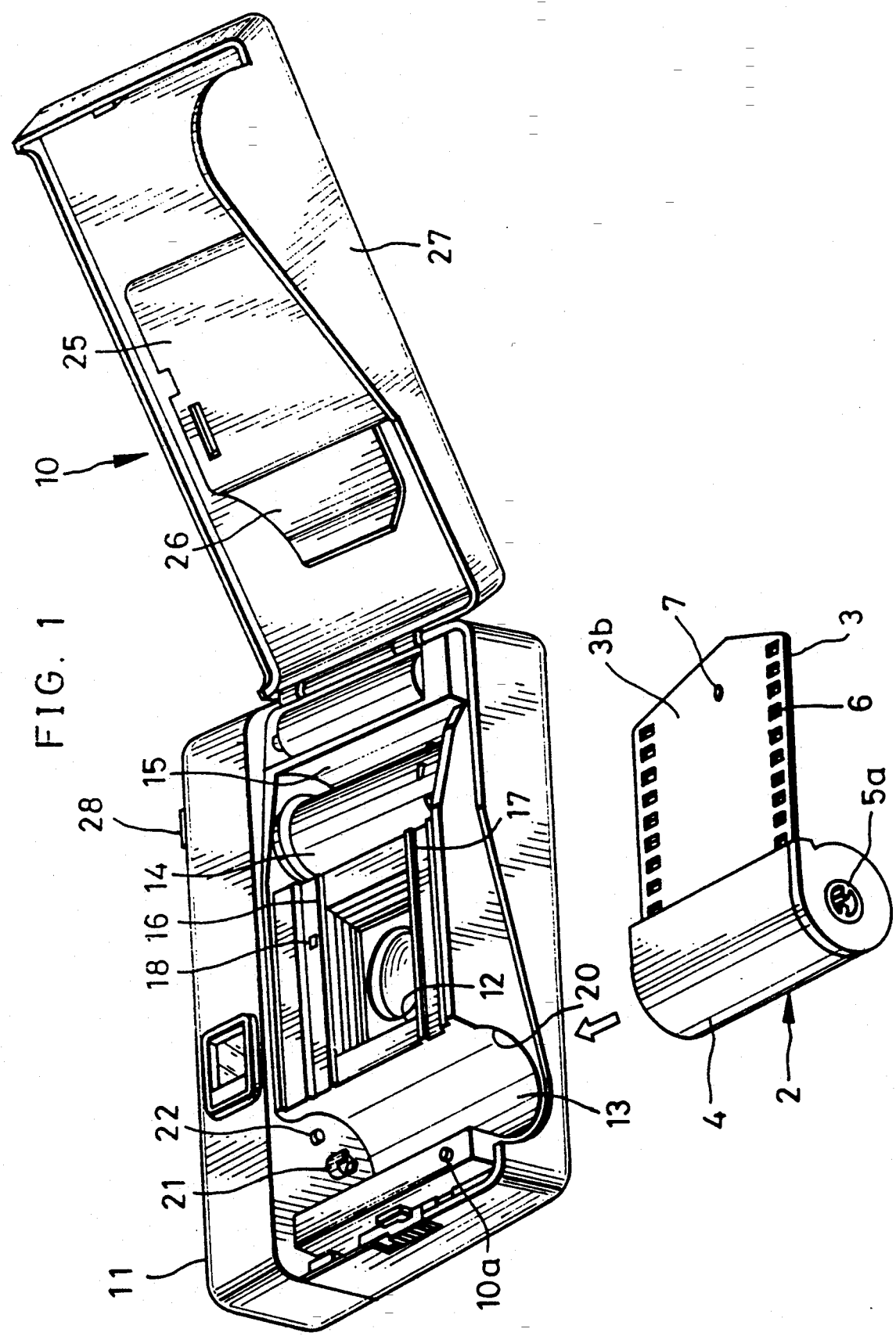
FIG. 1 is a perspective view illustrating a camera according to the present invention and a film cassette to be loaded therein.

In FIG. 1, there is shown a camera constructed according to a preferred embodiment of the present invention and a photographic film cassette 2 for use therewith. The film cassette 2 is provided with a photographic film 3 and a spool 5a which, when rotated, causes the photographic film 3 to advance. The film cassette 2 includes the photographic film 3 wound on the spool 5a, and a cassette shell 4 for containing the roll of photographic film 3 in a light-tight fashion. The photographic film 3 is provided with eight perforations 6 per frame, as is well known in the art, and an arresting hole 7 on a film leader 3b of the photographic film 3.

Figure 3:
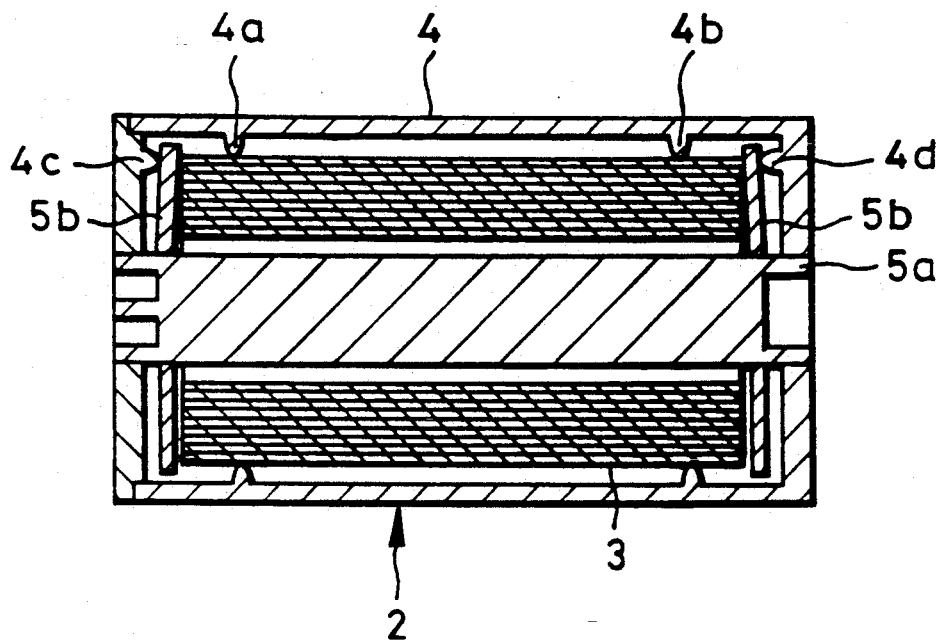
FIG. 3 is a section view illustrating the film cassette illustrated in FIG. 1.
Figure 4:
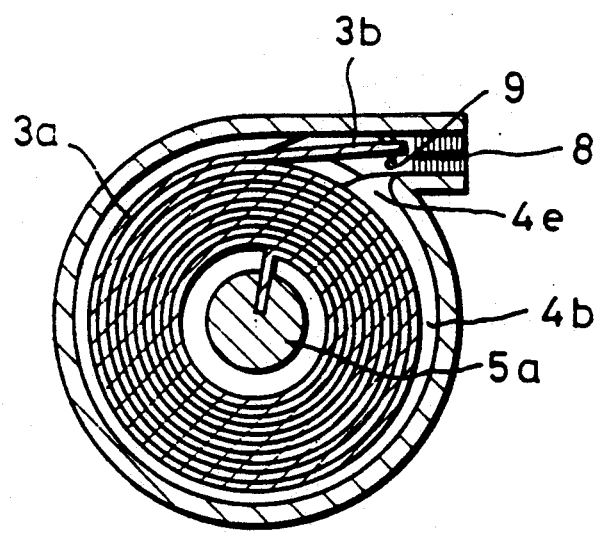
FIG. 4 is a section view in which an arresting hole formed in a film leader of the film cassette illustrated in FIG. 3 is arrested in a hook of the film cassette.

FIG. 3 shows the inside of the film cassette 2, which has a pair of flanges 5b fitted on both ends of the spool 5a. A pair of ridges 4c and 4d are formed on lateral walls of the inside surface of the cassette shell 4 in pressure contact with the flanges 5b, pressing them inward. The flanges 5b clamp both lateral edges of the photographic film 3 in order to prevent loosening of a film roll 3a. A pair of annular ridges 4a and 4b are formed on a circumferential surface of the cassette shell 4 in contact with the outermost turn of the loosened film roll 3a, as illustrated in FIG. 4, so as to limit the diameter of the film roll 3a to the diameter of the top of the flanges 5b. The trailing end of the photographic film 3 is arrested on the spool 5a.

A hook 9 is formed integrally with the cassette shell 4 in the vicinity of a film passageway 8, and is inserted in the arresting hole 7 formed on the film leader 3b. The hook 9 has an inclined surface formed thereon to easily disengage the arresting hole 7 from the hook 9 when advancing the film leader 3b through the film passageway 8 toward the outside. If the arresting hole 7 fails to be arrested by the hook 9, the film leader 3b will be fully wound around the spool 5a in the cassette shell 4. However, by rotating the spool 5 in the forward or normal direction to unwind the film 3, the film 3 will be separated by a separating claw 4e, which is formed on the annular ridge 4b, from the film roll 3a and will advance through the film passageway 8.

Figure 6:
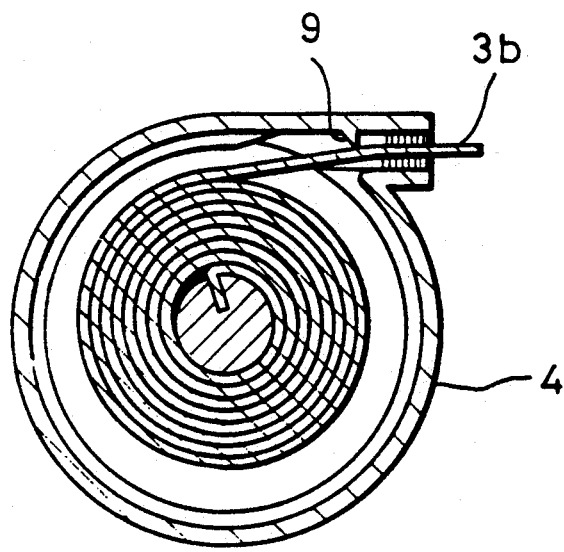
FIG. 6 is a section view in which the film leader illustrated in FIG. 5 is advanced out of a film passageway of the film cassette.
Figure 7:
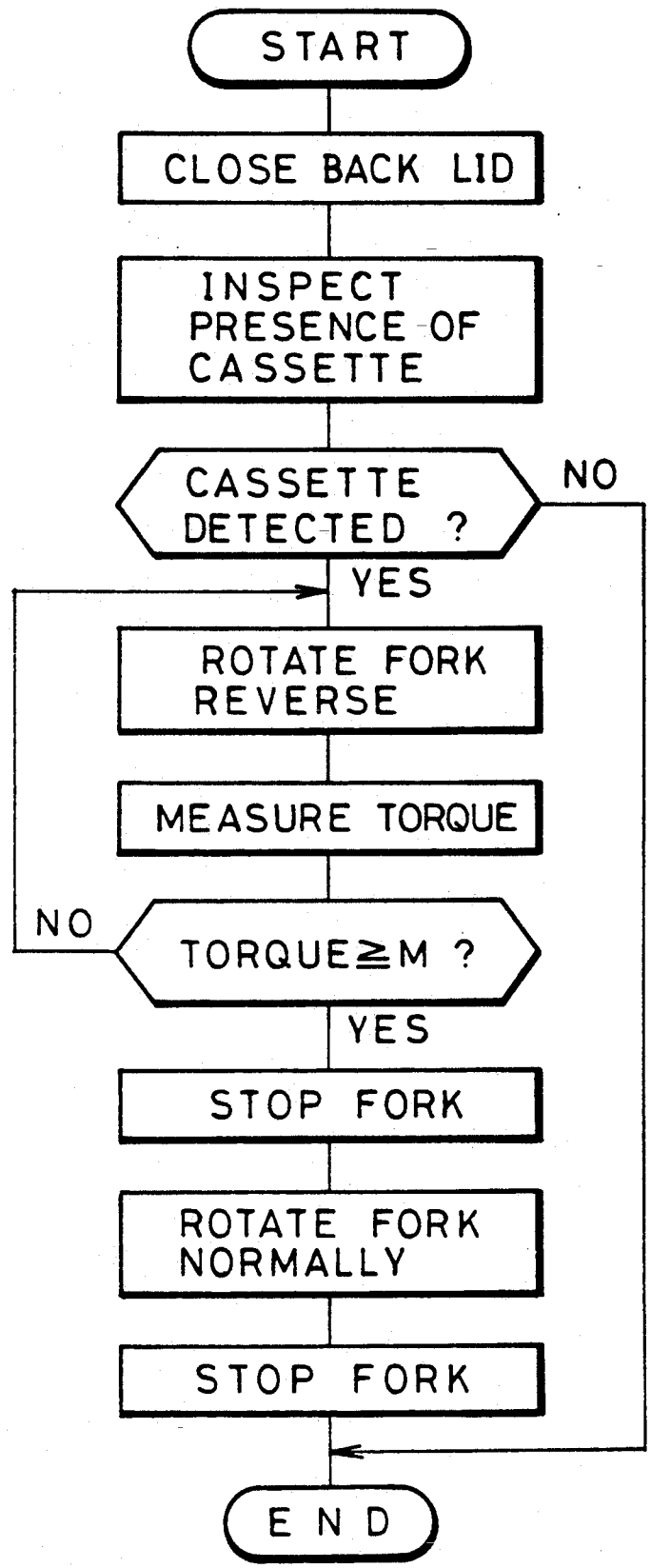
FIG. 7 is a flow chart illustrating an operation of advancing the film leader in the camera illustrated in FIG. 2.

In the film cassette 2 constructed as above, the film roll 3a rotates and unwinds when rotating the spool 5 in the normal direction. The arresting hole 7 is disengaged from the hook 9, so that the film leader 3b is advanced through the film passageway 8 out of the cassette shell 4 as illustrated in FIG. 6.

An exposure aperture 12 is formed on the center of the camera body 11 as shown in FIG. 1. To the left side of the exposure aperture 12 in the camera body 1 there is provided a cassette chamber 13, and the right side is provided with a film take-up chamber 15 which supports a take-up spool 14. A pair of guide rails 16 and 17 are formed along the upper and lower sides of the exposure aperture 12 between the cassette chamber 13 and the film take-up chamber 15.

Figure 2:
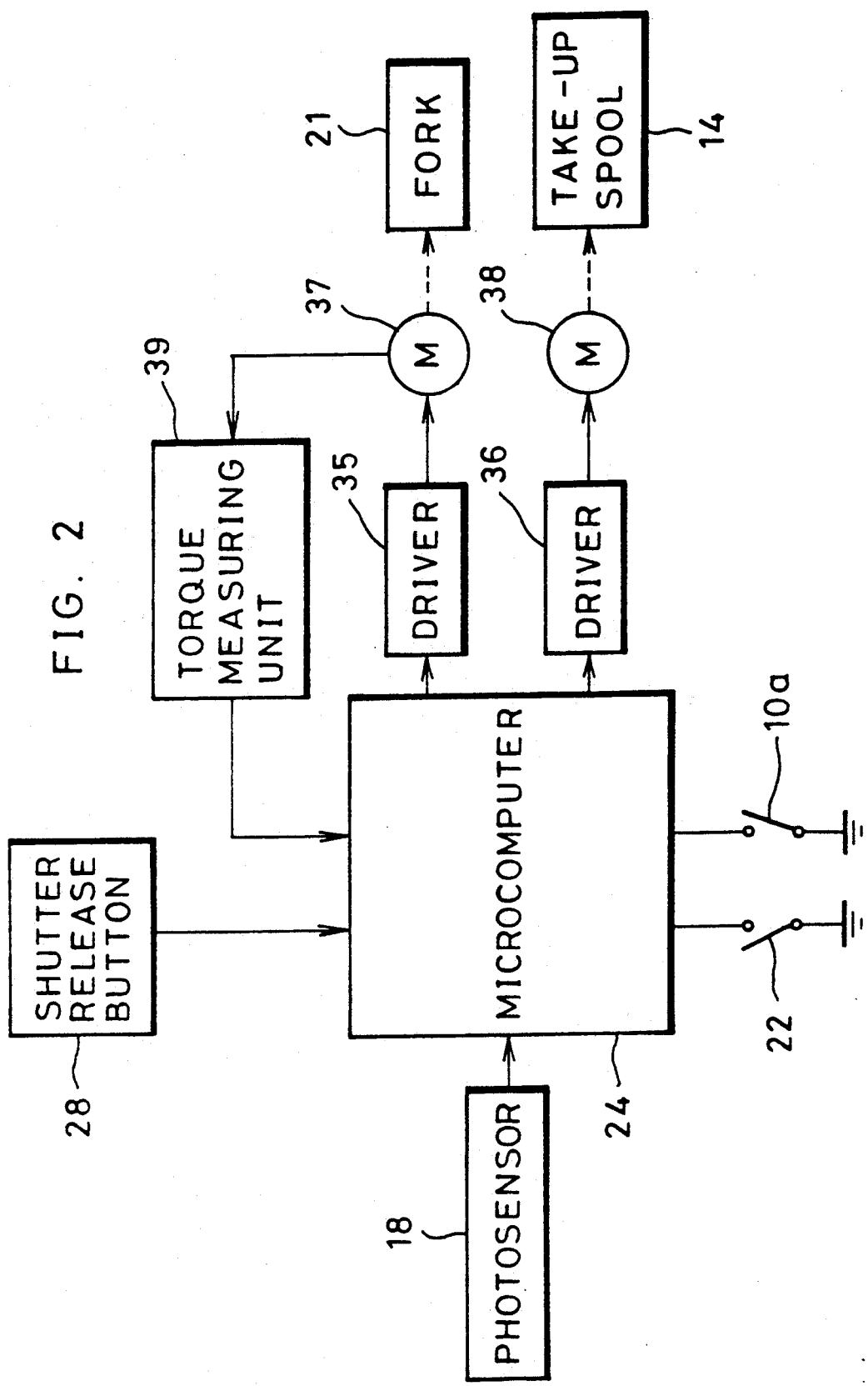
FIG. 2 is a block diagram illustrating a circuit of a film feeding mechanism of the camera illustrated in FIG. 1.

In the vicinity of the guide rail 16, a reflection-type photo-interrupter or photosensor 18 is provided in the position where the perforations 6 of the photographic film 3 pass and are disposed vertically to the feeding direction of the photographic film 3. The photosensor 18 detects the photographic film 3 passing therethrough and supplies a detection signal to a microcomputer 24, as illustrated in FIG. 2. In response to the detection signal, the microcomputer 24 controls the rotation of the take-up spool 14 and a fork 21 (described below in detail) so as to position each frame to be exposed on the exposure aperture 12.

An opening 20 is formed on the bottom of the camera body 11, through which the film cassette 2 is inserted in the cassette chamber 13 in the axial direction of the spool 5. The fork 21 is disposed in the innermost surface of the cassette chamber 13 and engaged with the spool 5 to rotate it in both the normal and reverse directions (i.e., winding and rewinding the photographic film 3). The rotation of the fork 21 is carried out by a driving motor 37 incorporated in the camera body A cassette detecting switch 22 is provided in the vicinity of the fork 21 for detecting the insertion of the film cassette 2. When the film cassette 2 is loaded in the camera body 11, the switch 22, when actuated by being depressed, supplies an ON signal to the microcomputer 24.

A pressure plate 25 and a guide plate 26, which are well-known in the art, are attached to the back lid 10, and cause the take-up spool 14 to take up the film leader 3b advanced out of the cassette shell 4. A bottom lid 27 is formed integrally with the back lid 10 for shielding the opening 20 from light. The open/closed state of the back lid 10 is detected by a back lid switch 10a disposed in the vicinity of the cassette chamber 13 and forwarded to the microcomputer 24. A shutter release button 28 is provided on the top of the camera body 11. After each operation of releasing the shutter by use of the shutter release button 28, the photographic film 3 is automatically advanced to the next frame.

In FIG. 2, there is shown an electric circuit of a film feeding mechanism, which is controlled entirely by the microcomputer 24. The microcomputer 24, which is supplied with signals from the cassette detecting switch 22, the back lid switch 10a, the photosensor 18, and the shutter release button 28, processes the supplied signals in accordance with a predetermined sequence, and controls motors 37 and 38 by use of drivers 35 and 36.

A torque measuring unit 39, connected to the motor 37, measures a current flowing therein during rotation of the motor 37 to detect a rotary load applied to the fork 21 which is in proportion to the measured current. When the rotary load surpasses a predetermined value, the torque measuring unit 39 supplies the microcomputer 24 with a stop signal for stopping the motor 37. The microcomputer 24 then supplies a film feeding signal to the driver 35 for rotating the fork 21 in the normal direction so as to drive the motor 37.

The operation of the above-constructed camera is now described with reference to FIGS. 1 and 5 to 7. When the back lid 10 is closed after the cassette chamber 13 has been loaded with the film cassette 2, the back lid switch 10a and the cassette detecting switch 22 are actuated. The microcomputer 24 causes the driver 35 to drive the motor 37, which causes the fork 21 to rotate in the reverse direction. The spool is thereby rotated in the reverse direction. In the film cassette 2, the film roll 3a is tightly wound because the film leader 3b is arrested by the hook 9.

Figure 5:
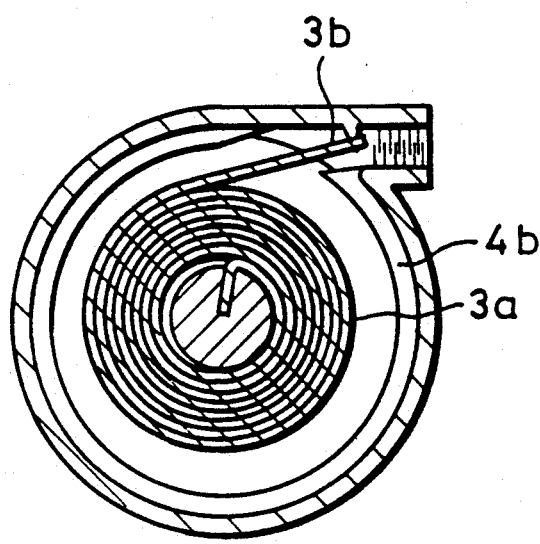
FIG. 5 is a section view in which the arresting hole in FIG. 4 is to be disengaged from the hook.

The rotary load applied to the fork 21 increases as the tightness of the winding of the film roll 3a increases. The torque measuring unit 39 supplies the microcomputer 24 with a stop signal upon detecting a current corresponding to a predetermined rotary load M. The microcomputer 24 then stops the motor 37 from rotating. The diameter of the outer winding of the film roll 3a is now smaller, as illustrated in FIG. 5. Accordingly, the outer surface of the film roll 3a is no longer in contact with the annular ridges 4a and 4b. Because the film roll 3a is wound so tightly, it is clamped between the flanges 5b and kept tightly wound. The rotary load M is preferably determined to be 300 to 1000 gf.cm.

Next, the microcomputer 24 supplies the driver 35 with a film feeding signal to drive the motor 37 which rotates the fork 21 in the normal direction. The rotation of the fork 21 causes the spool 5 to rotate in the normal (or forward) direction so as to advance the film leader 3b out of the cassette shell 4. The film leader 3b is advanced without the outer surface of the film roll 3a being in contact with the annular ridges 4a and 4b, so that a small torque for driving the motor 37 is sufficient.

The photographic film 3 is slid along the guide rails 16 and 17, sent to the film take-up chamber 15, and taken up on the take-up spool 14. The take-up spool 14 has claws for engaging the perforations 6 for reliably winding the film leader 3b on the take-up spool 14 in the same direction of rotation as the fork 21 which is under the control of the microcomputer 24. The microcomputer 24 counts the perforations 6 by receiving signals from the photosensor 18 while feeding the photographic film 3. The drivers 35 and 36 are supplied with a drive stop signal by the microcomputer 24 to stop the motors 37 and 38 when the counted number of perforations increases up to a predetermined number. Once the first frame of the photographic film to be exposed is positioned on the exposure aperture 12, the film initial advancement is completed.

When the shutter release button 28 is pressed to take a photograph, the photographic film 3 is automatically wound so that a second (or next) frame to be exposed is positioned on the exposure aperture 12. Repetition of taking a photograph causes the camera to wind the entire photographic film 3. When no further photographic film 3 remains, the take-up spool 14 and the motor 38 receive a large load. When such a large load is detected, the microcomputer 24 causes the motors 37 and 38 to rotate in the opposite or reverse direction. The spool 5 is then rotated in the reverse direction to wind the exposed photographic film 3 into the cassette shell 4. The hook 9 thereafter arrests the arresting hole 7 when rewinding the film leader 3b to stop the film leader 3b in the vicinity of the film passageway 8. The load on the motor 37 is sensed so that the microcomputer 24 stops the motors 37 and 38 and finishes rewinding the photographic film 3 in accordance with the detected load.

Figure 8:
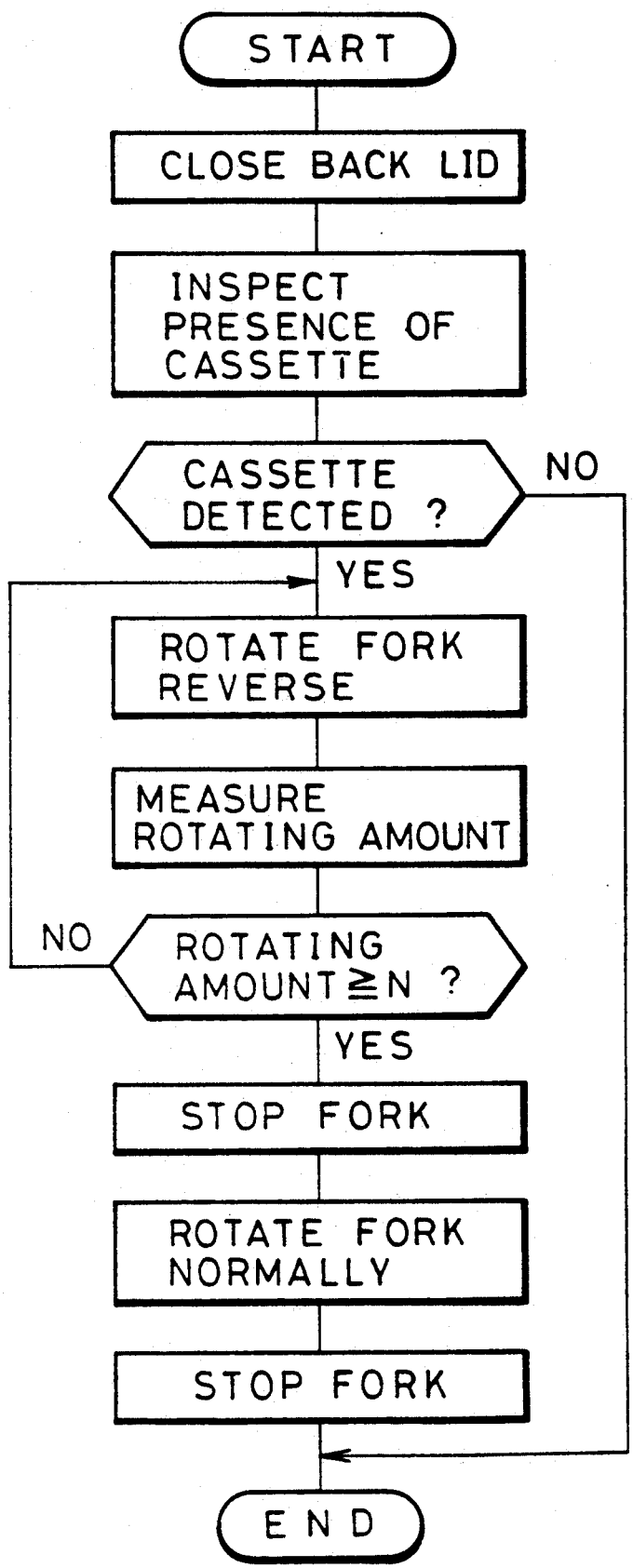
FIG. 8 is a flow chart illustrating an operation of advancing a film leader in a camera according to a preferred embodiment.

Referring to FIG. 8, a method of advancing a film leader according to another preferred embodiment of the present invention is shown. A film cassette 50 for use with a camera in accordance with the second embodiment does not arrest the film leader 3b on the inside of the cassette shell 4 as in the first embodiment.

Figure 9:
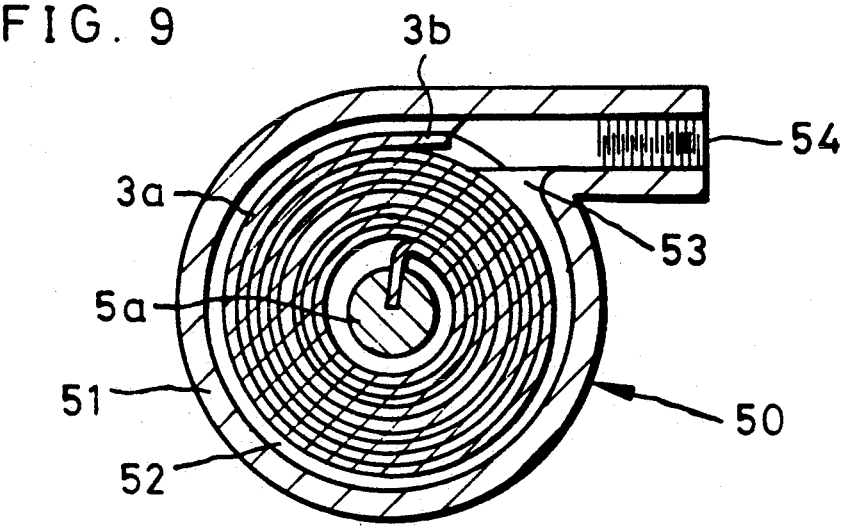
FIG. 9 is a section view illustrating another film cassette to be loaded in the camera illustrated in FIG. 8.
Figure 10:
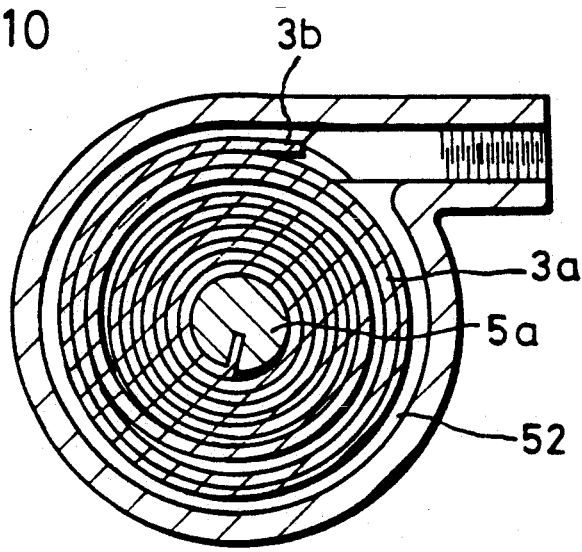
FIG. 10 is a section view in which a film leader is advanced out of the film cassette illustrated in FIG. 9.
Figure 11:
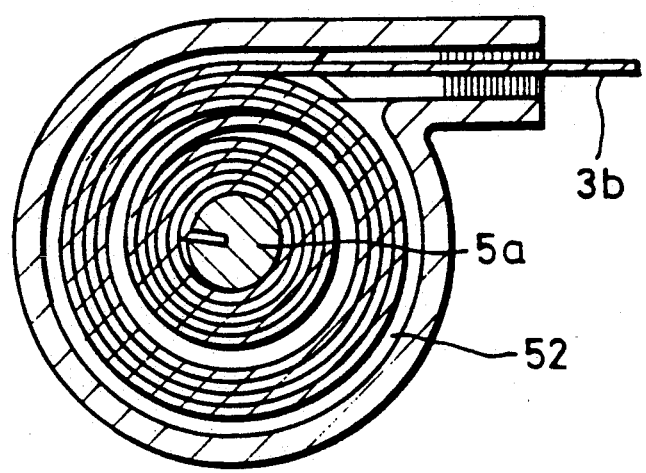
FIG. 11 is a section view in which the film leader in FIG. 10 is advanced out of the film cassette.

FIGS. 9 to 11 illustrate the film cassette 50, of which a cassette shell 51 is provided with a pair of annular ridges 52 formed inside for preventing the photographic film 3, which is wound on the spool 5, from loosening. A separating claw 53 is formed on one of the annular ridges 52, and separates the film leader 3b rotating in the normal direction from the outer surface of the film roll 3a to guide it to a film passageway 54. Rotation of the spool 5 of the film cassette 50 in the normal direction causes the film leader 3b to advance out of the cassette shell 51. The film roll 3a loosens with time because of the stiffness of the photographic film 3 such that there are formed spacings between the spool 5 and the innermost turns of the film, whereas the outer turns of the film are wound tightly or densely. The outermost turn presses the annular ridges 52 with a large force.

In place of the torque measuring unit 39 of the former embodiment, the camera has a rotating amount measuring unit for measuring the amount of rotation of the fork 21. When the film cassette 50 is loaded in the camera having the rotating amount measuring unit, the microcomputer 24 drives the motor 37, via the driver 35, so as to rotate the fork 21 in the reverse direction. The spool 5 is rotated in the reverse direction so that the inner turns of the film roll 3a are wound more tightly.

The motor 37 rotates the fork 21 for N rotations, and then stops the fork 21 by supplying a stop signal from the rotating amount measuring unit to the microcomputer 24. The above tightening wind-up is performed in the inner turns, but not in the outer turns, and therefore the film roll 3a is held in the state illustrated in FIG. 10. The pressing force of the outer surface of the film roll 3a on the annular ridges 52 becomes smaller. It is noted that predetermination of the rotating amount N of the fork 21 within the range of 3 to 5 makes it possible to reduce the pressing force of the film roll 3a against the annular ridges 52 even without shifting the relative position of the film leader 3b to the cassette shell 51.

The microcomputer 24 causes the driver 35 to drive the motor 37 in the normal direction of rotation. When the motor 37 is rotated in the normal direction, the spool 5 is rotated in the normal direction by use of the fork 21. The film leader 3b is advanced by rotation out of the cassette shell 51, as illustrated in FIG. 11. The rotation of the fork 21 in the normal direction is smoothly carried out since the pressing force of the outer surface of the film roll 3a against the annular ridges 52 is reduced because the inner turns of the film roll 3a have been tightened. Although the camera according to the present embodiment is loaded with the film cassette 50 which includes no arresting structure, the same camera can be also loaded with the film cassette 2 wherein the film leader 3b is arrested on the cassette shell. Although the load on or the number of rotations of the fork 21 is measured and compared by use of the motor 37 to stop the fork 21 from rotating in the reverse direction before advancing the photographic film 3, alternatively, the microcomputer 24 may control a timing device for stopping the motor 37 after a predetermined time has elapsed.

Figure 12:
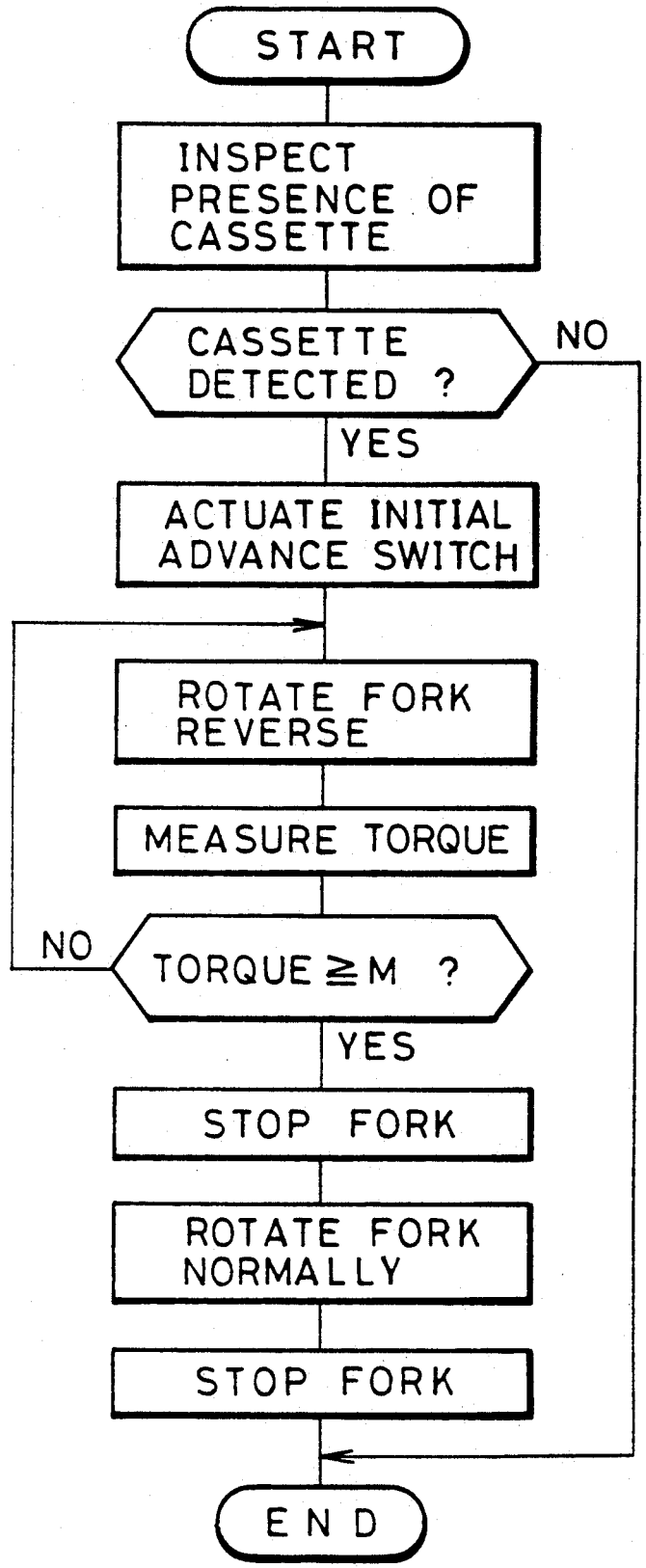
FIG. 12 is a flow chart illustrating an operation of advancing a film leader in a camera according to another preferred embodiment.

Illustrated in FIG. 12, there is shown a method for advancing the photographic film of a camera according to a third preferred embodiment. The camera is provided with a manipulable film initial advance switch which is operated to advance the film leader after loading the film cassette, which is unlike the camera of the former embodiments in which the initial advancement of the film is automatically effected according to the operation of the back lid switch 10a and the cassette detecting switch 22. The initial advance switch may be either combined with the shutter release switch 28, or separated therefrom. While the back lid switch 10a and the cassette detecting switch are actuated in the present embodiment, the microcomputer 24 waits for the actuation of the initial advance switch in order to advance the film.

Figure 13:
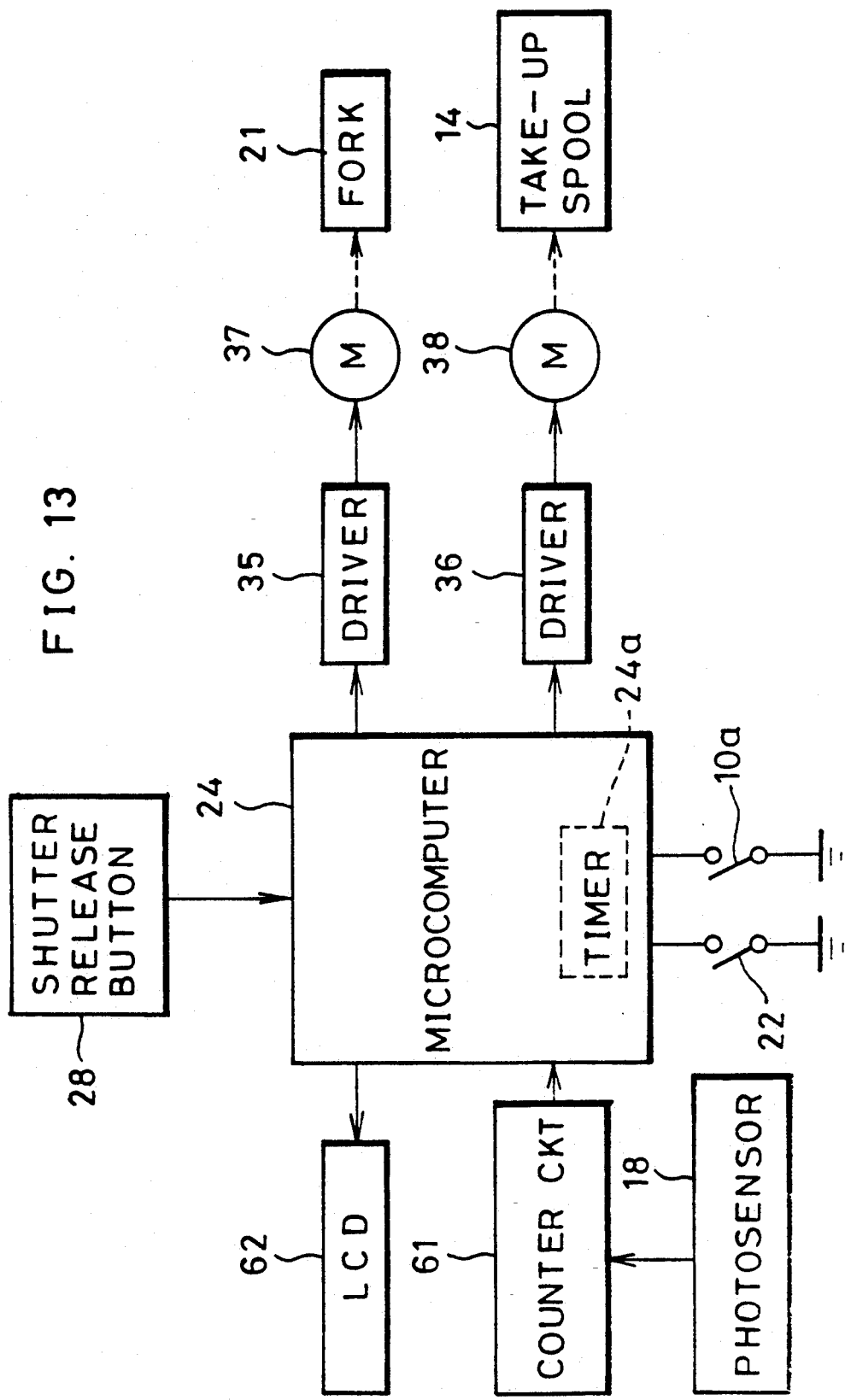
FIG. 13 is a block diagram illustrating a circuit of a film feeding mechanism of a camera according to a second preferred embodiment.
Figure 14:
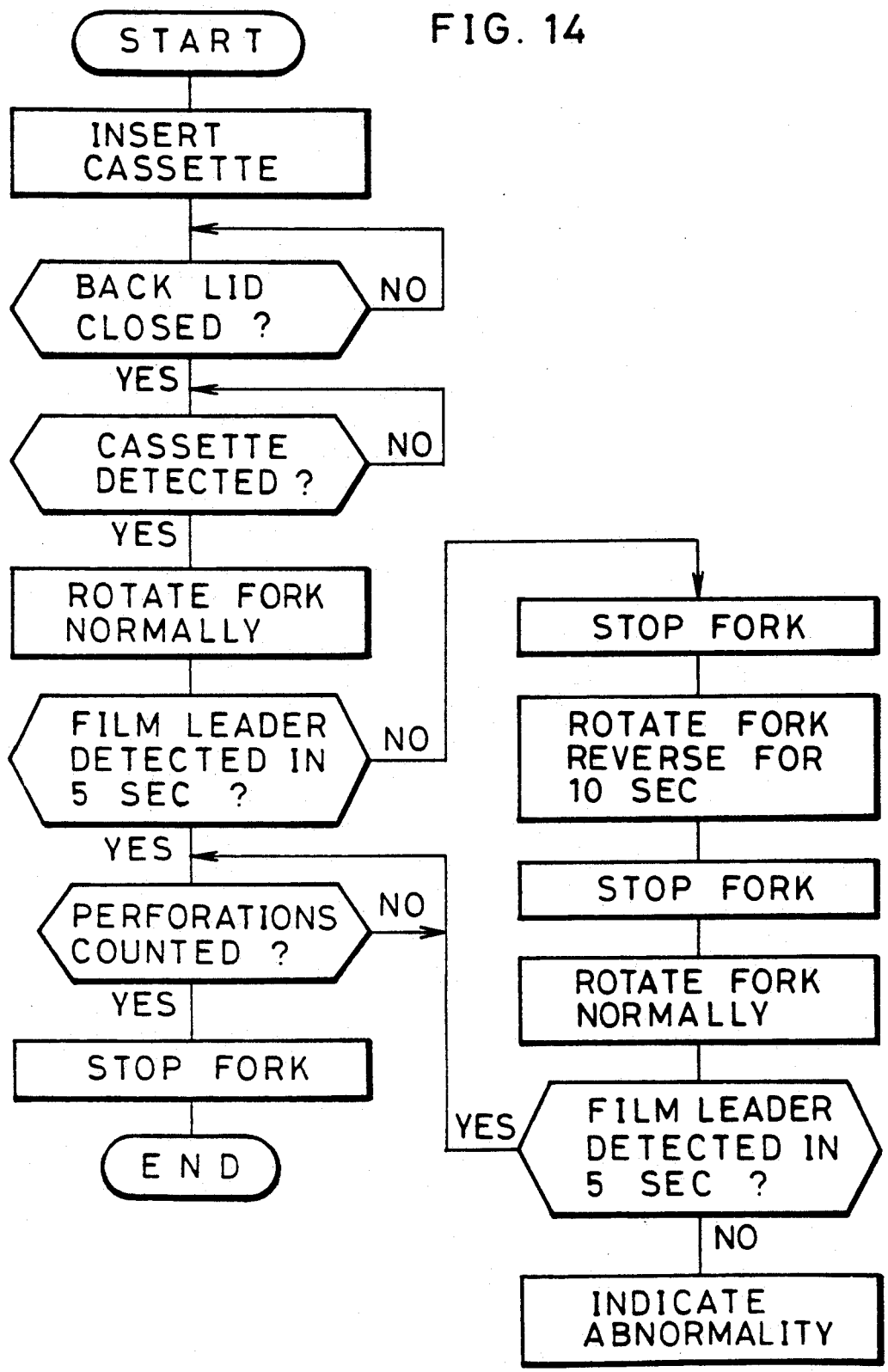
FIG. 14 is a flow chart illustrating an operation of advancing a film leader in the camera illustrated in FIG. 13.

FIGS. 13 and 14 illustrate a camera feeding mechanism device according to yet another preferred embodiment. Elements similar to those in the first embodiment are designated by the same reference numerals in FIG. 13. The fork 21 is first rotated in the reverse direction in order to tighten the winding of the film roll 3a, and second rotated in the normal direction in order to advance the film leader 3a out of the cassette shell 4. In the present embodiment, the fork 21 is first rotated in the normal direction to advance the film leader 3b. If it is impossible to advance the film leader 3b by rotating the spool 5 in the normal direction, the spool 5, and hence the photographic film 3, is rotated in the reverse direction to tighten the film roll 3a in the cassette shell 4. If the film leader 3b cannot be advanced even after two times of normal rotation of the spool 5, an indication of abnormality such as "FILM JAM" is indicated on a liquid crystal display panel 62. It is noted that the camera according to the present embodiment may be loaded both with a film cassette 2 in which the film leader 3b is arrested on the cassette shell 4, and a film cassette 50 in which the film leader is not arrested on the cassette shell 51.

The operation of advancing a film in the above-constructed camera will now be described. When the back lid switch 10a and the cassette detecting switch 22 are turned on, the microcomputer 24 controls the driver 35 for driving the motor 37 so as to rotate the fork 21 in the normal direction. The film leader 3b of the photographic film 3 is advanced out of the cassette shell 4 or 51.

When the leading end of the film leader 3b passes over the photosensor 18, the photosensor 18 detects passage of the photographic film 3 and supplies a detection signal to a counter circuit 61. When a film portion with no perforations thereon passes the photosensor 18, continuous passage of the photographic film 4 results because the photosensor 18 supplies no output. The detection signal has a waveform of pulses constituting a repetition of either an output or no output. The counter circuit 61 supplies a film detection signal to the microcomputer 24 upon receiving an initial detection signal from the photosensor 18, and counts the pulses of the detection signal so as to supply the microcomputer 24 with a count signal according to the number of the counted pulses.

If the microcomputer 24 receives the film detection signal before the lapse of 5 seconds, which is measured by a timer 24a within the microcomputer 24, from supplying the drive signal to the driver 35, then it is determined that the film leader 3b is successfully advanced out of the cassette shell. The microcomputer 24 controls the motor 37 until the count value of the count signal reaches a predetermined count value. Because the take-up spool 14 has begun rotation, the film leader 3b is taken up and wound on the take-up spool 14. The maximum time from supplying the drive signal to receiving the film detection signal is predetermined in the microcomputer 24 to be approximately 5 seconds, but is not limited thereto.

When the count value reaches the predetermined value, the microcomputer 24 supplies the driver 35 with a stop signal to stop rotation of the motor 37. The first frame of the photographic film 3 to be exposed is positioned on the exposure aperture 12 to finish the initial advancement of the film.

If the microcomputer 24 receives no film detection signal even after 5 seconds have elapsed since the drive signal was supplied to the driver 35, then the microcomputer 24 determines that the film leader 4b has failed to be advanced, stops the motor 37 from rotating, and supplies a reverse drive signal to the driver 35 for driving the motor 37 in reverse. The spool 5 is then rotated through the fork 21 in the reverse direction so as to tighten the film roll 3a.

The microcomputer 24 stops the motor 37 from rotating in the reverse direction at the lapse of approximately 10 seconds from supplying the reverse drive signal, and then supplies a drive signal to the motor 37 to rotate the fork 21 in the normal or initial direction. If the microcomputer 24 receives no film detection signal even at the lapse of 5 seconds or less from supplying the second drive signal, then it supplies a signal for indicating an abnormal state on the liquid crystal display panel 62. The time period from supplying the reverse drive signal to stopping reverse rotation of the motor 37 is predetermined to be about 10 seconds, but is not limited thereto.

It is noted that, although two kinds of film cassettes in which the photographic film is prevented from loosening by the flanges and annular ridges can be used with the camera according to the present invention, an alternative film cassette may be used, such as a type disclosed in U.S. Pat. Nos. 4,846,418 and 4,887,776 in which the spool is constituted of a pair of spool pieces which are slid toward each other to clamp the film roll.

Also, although in the above-described embodiments eight perforations are formed on the photographic film per frame, it is possible to use a photographic film on which one perforation is formed per frame.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photographic camera of the type which is loaded with a photographic film cassette having a spool which is rotated to advance a film leader of a photographic film out of the film cassette, comprising:
    a cassette chamber for containing said film cassette;
    a rotary member provided in said cassette chamber for being coupled with said spool in order to rotate said spool;
    a motor for rotating said rotary member;
    detecting means for detecting said photographic film fed from said film cassette and for generating a detection signal in response to said detection; and
    drive control means for driving said motor in a rewinding direction so as to tighten said photographic film on said spool and for driving said motor in an unwinding direction in order to advance said film leader, said drive control means rotates said motor in said unwinding direction before rotating said motor in said rewinding direction, and rotates said motor in said rewinding direction to tighten said film on said spool if said detection signal is not generated within a predetermined period of time after rotation of said motor in said unwinding direction has started.

2. A photographic camera as recited in claim 1, wherein a time period for rotating said motor in said rewinding direction is predetermined.

3. A photographic camera as recited in claim 2, wherein said detecting means is a photosensor.

4. A method of advancing a film leader of a film cassette, in which rotation of a spool in an unwinding direction causes said film leader to advance out of a cassette shell, in a photographic camera including a cassette chamber for containing said film cassette and a rotary member provided in said cassette chamber for engaging said spool of said film cassette to rotate said spool, said film leader advancing method comprising the steps of:
    loading said film cassette in said cassette chamber;
    rotating said rotary member in said unwinding direction for advancing said film leader;
    determining whether said photographic film has advanced; and
    rotating said rotary member in a rewinding direction, which is opposite to said unwinding direction, so as to tighten said photographic film on said spool when said photographic film has not advanced within a predetermined time period after rotation of said rotary member in said unwinding direction has started.

* * * * *